(12) United States Patent
Kim

(10) Patent No.: US 6,215,749 B1
(45) Date of Patent: Apr. 10, 2001

(54) SIGNAL DISTORTION MINIMIZATION APPARATUS IN HIGH SPEED OPTICAL DISC REPRODUCING DEVICE

(75) Inventor: Chun-Sup Kim, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/178,473

(22) Filed: Oct. 26, 1998

(51) Int. Cl.$^7$ ............................................. G11B 7/00
(52) U.S. Cl. ........................ 369/54; 369/44.29; 369/44.35
(58) Field of Search .................................. 369/47, 48, 49, 369/50, 54, 58, 59, 60.1, 44.28, 44.29, 44.34, 44.35

(56) References Cited

U.S. PATENT DOCUMENTS 5,808,979 * 9/1998 Ishibashi et al. ................. 369/44.35

\* cited by examiner

Primary Examiner—Muhammad Edun
(74) Attorney, Agent, or Firm—Sughrue, Mion, Zinn, Macpeak & Seas, PLLC

(57) ABSTRACT

A high speed optical disc reproducing device includes: a gain amplifier for amplifying data picked-up from an optical disc, with a specific amplification gain and a frequency and boost control unit for outputting a frequency and boost gain control signal under the control of a main control unit in accordance with the kind of pick-up and disc used in the reproducing device. The device also includes a boost filter, which serves the functions of boosting high frequency parts of the output signal of the gain amplifier according to the frequency and boost gain control signal, and a uniform group-delaying section which group-delays all of the frequency areas of the output signal. The device minimizes the signal distortion, caused by the difference in the pick-up and disc characteristics of a high speed optical disc reproducing device.

8 Claims, 6 Drawing Sheets

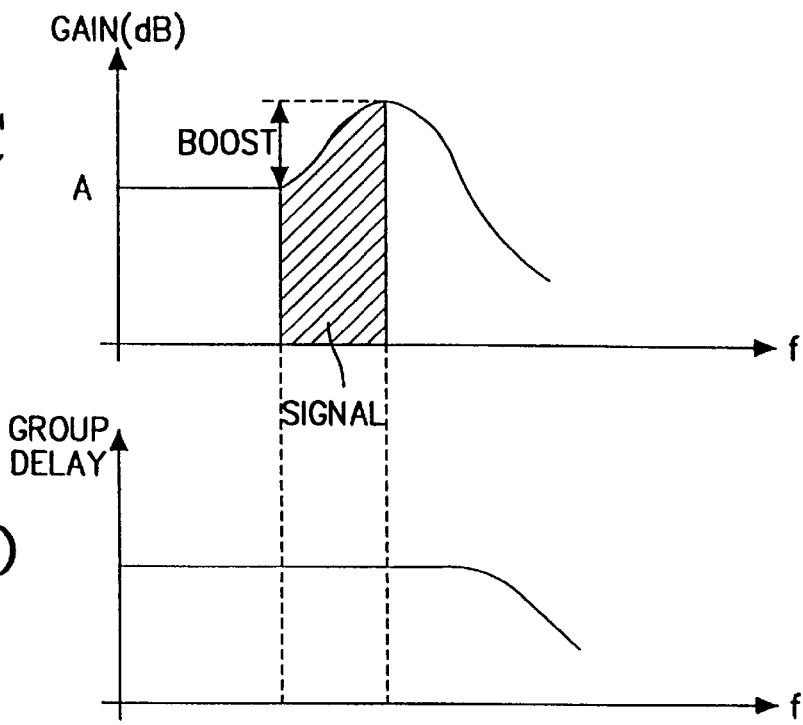
FIG. 2C
FIG. 2D
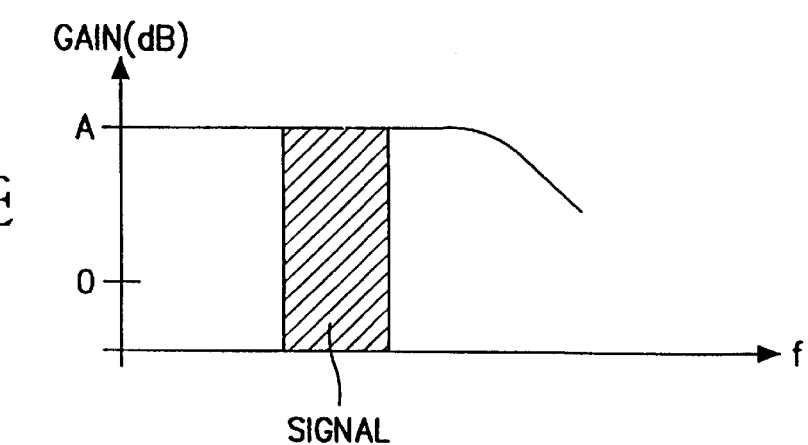
FIG. 2E

SIGNAL DISTORTION MINIMIZATION APPARATUS IN HIGH SPEED OPTICAL DISC REPRODUCING DEVICE

BACKGROUND OF THE INVENTION

1. Field of the Invention

This invention relates to digital signal recording and reproducing devices. Specifically, this invention is an apparatus for minimizing the signal distortion, caused by the difference in pick-up and disc characteristic of a high speed optical disc reproducing device.

2. Description of the Related Art

In digital signal recording and reproducing devices, especially optical disc reproducing devices which read data of optical disc at a high speed, such as CD-ROM, DVDP (Digital Versatile Disc Player), DVD-ROM, etc., a signal (input signal) read from an optical disc by a pick-up mechanism has various levels in accordance with its frequency area. This is because the picked-up signal has high frequency components whose amplitudes are lower than that of other frequencies. In addition, the level of the picked-up signal varies with the kind of pick-up (depending on its speed, for example), and kind of disc (CD or DVD).

Therefore, it is preferable to compensate for the attenuation of input signal, and get rid of the group delay deviation. However, a conventional boost circuit allows the gain to be amplified, simultaneously causing the group delay to be altered. As a result, the output signal is distorted. The conventional boost circuit can not be used in optical disc reproducing device which reads data from an optical disc at a high speed, such as CD-ROM, DVDP (Digital Versatile Disc Player), DVD-ROM, etc.

A device which is applicable to high speed optical disc players and CD-ROM, DVD, etc., is required to solve the above-mentioned problem.

SUMMARY OF THE INVENTION

An objective of the present invention is to provide an apparatus which reads data from an optical disc at a high speed and minimizes the signal distortion, caused by the difference in the pick-up and the disc characteristics.

Another objective of the present invention is to provide an apparatus for preventing the signal distortion, by boosting and group-delaying a read signal, so as to be applicable to various kinds of disc players.

To achieve the objective of the present invention, a high speed optical disc reproducing device includes: a gain amplifier for amplifying data picked-up from an optical disc with a specific amplification gain; a frequency and boost control unit for outputting frequency and boost gain control signal under the control of a main control unit in accordance with the kind of pick-up and disc used; and a boost filter which serves the functions of boosting the high frequency signals of output signal of the gain amplifier according to the frequency and a boost gain control signal, and specifically group-delaying of all the frequency areas of the output signal.

BRIEF DESCRIPTION OF THE DRAWINGS

FIGS. 2A-2E show wave form charts corresponding respectively to points (a), (b), (c-1), (c-2) and (d) in FIG. 1;

DETAILED DESCRIPTION OF THE PREFERRED EMBODIMENT

Figure 1:
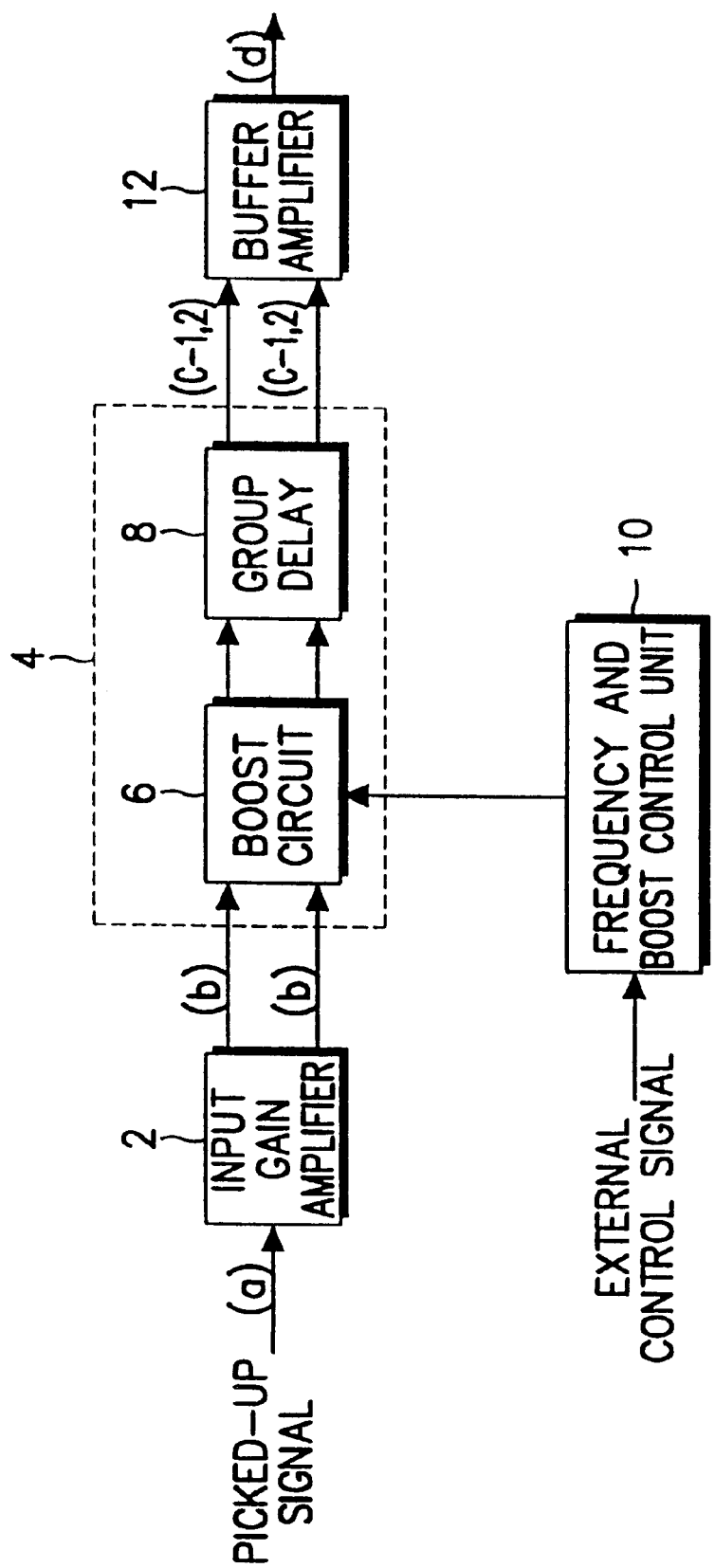
FIG. 1 is a block diagram showing the configuration of a preferred embodiment of the present invention.

Hereinafter, the preferred embodiments of the present invention will be described in detail with reference to the accompanying drawings, in which like reference characters designate the same or similar parts throughout the figures thereof. A detailed description of the known operation and construction that depart from the spirit and scope of the invention will be omitted.

Referring to FIG. 1, which is a block diagram showing the configuration of a preferred embodiment of the present invention, an apparatus for minimizing the signal distortion, caused by the difference in the pick-up and disc characteristics of a high speed optical disc reproducing device, includes: an input gain amplifier 2; a boost filter 4 having a boost circuit 6 and a group delay 8; a frequency and boost control unit 10; and a buffer amplifier 12.

Figure 2A:
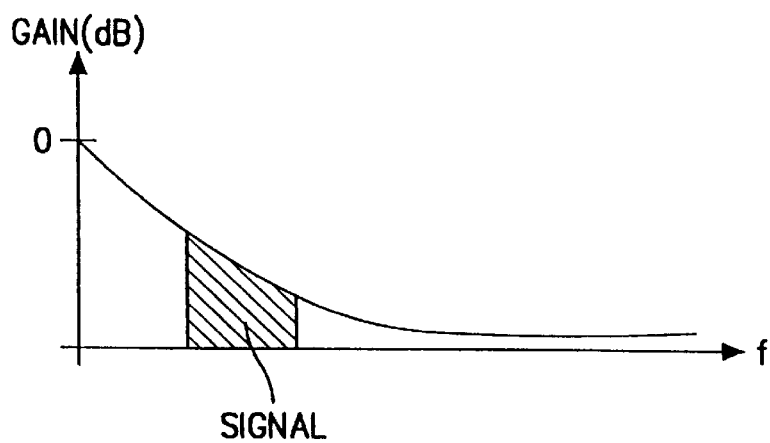

FIGS. 2A thru 2E show wave form charts corresponding respectively to points (a), (b), (c-1), (c-2) and (d) of FIG. 1. FIG. 2A is a wave form of signal inputted into the input gain amplifier 2. FIGS. 2C and 2D are output wave forms of the boost filter 4, and 2E is an output wave form of the buffer amplifier 12.

In optical disc reproducing devices which read data from an optical disc at a high speed, such as CD-ROM, DVDP (Digital Versatile Disc Player), DVD-ROM, etc., a signal (input signal), picked-up from an optical disc by a pick-up, has high frequency components whose amplitudes are lower than that of other frequencies, as shown in FIG. 2A. Thus, it is necessary to correct such a signal distortion.

Figure 2B:
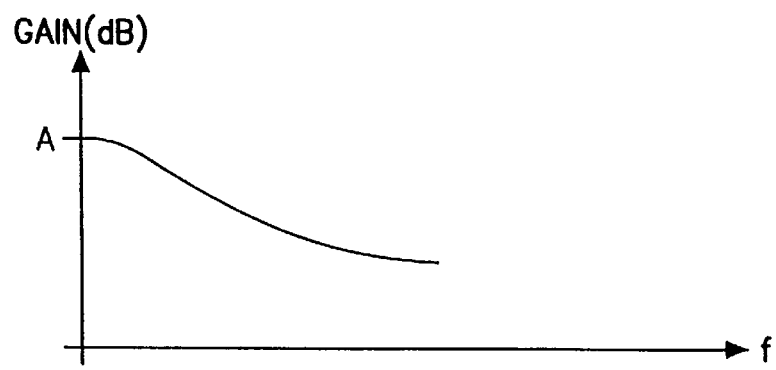

The input signal (FIG. 2A) picked-up from the disc by a pick-up is amplified by a specific gain factor A, before being outputted as shown in wave form of FIG. 2B. The input gain amplifier 2 divides one input into two outputs, so as to raise the S/N ratio (Signal/Noise ratio). The picked-up signal which is amplified as shown in the wave form of FIG. 2B is applied to the boost filter 4.

The picked-up signal varies in level in accordance with the kind of pick-up and kind of disc used. Therefore, the main control unit of the high speed optical reproducing device applies an external control signal in accordance with the kind of pick-up and disc, to the frequency and boost control unit 10 of FIG. 1. The frequency and boost gain control signal is applied to the boost circuit 6 in the boost filter 4 under the control of the main control unit (not shown) in accordance with the kind of pick-up and disc, by the frequency and boost control unit 10.

The boost filter 4 comprises boost circuit 6 and group delay 8. The boost circuit 6 is in responds to the frequency and boost gain control signal, applied by the frequency and boost control unit 10, and the input gain amplifier 2 amplifies and outputs the signal with a gain in accordance with frequency area of the output. In particular, the signal level of high frequency area is boosted at the input gain amplifier 2. FIG. 2C shows that the signal component in high frequency area is boosted during the output of the input gain amplifier 2. The group delay 8 of boost filter 4 allows specific group delay regardless of all the frequency areas of output of the input gain amplifier 2, and removes high frequency noise of the signal. The group delay 8 includes a plurality of low pass filters, and is expressed as follows:

transfer function $F(s)=(s^2-c^2)/(s^2+as+b)$, wherein the value of zero pole, which is a root of $s^2-c^2$, is $\pm c$, and factors of a and b are selected by bessel function values.

The characteristic of such a group delay 8 is that the zero poles are equidistant on the right and on the left of a Y axis on the s-plane. The gain of signal varies with frequency by means of boost circuit 6, but the zero poles which are symmetrically right and left on the basis of a Y axis, move simultaneously, to thereby maintain the group delay in its uniform state regardless of frequency, as shown in part (c-2) of FIG. 2B.

Figure 3A:
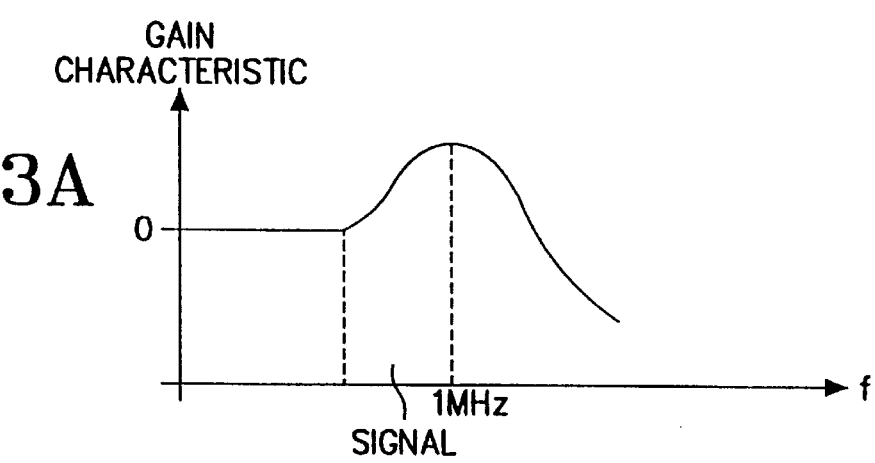
FIGS. 3A and 3B show the gain characteristic and the group delay characteristic respectively, for 1X speed CD.
Figure 3B:
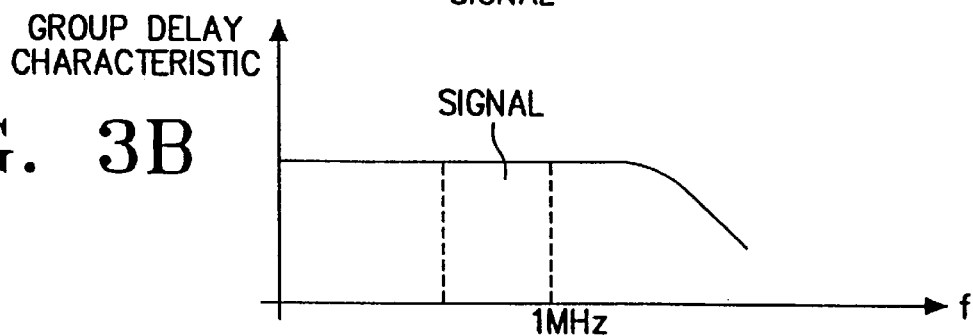
Figure 3C:
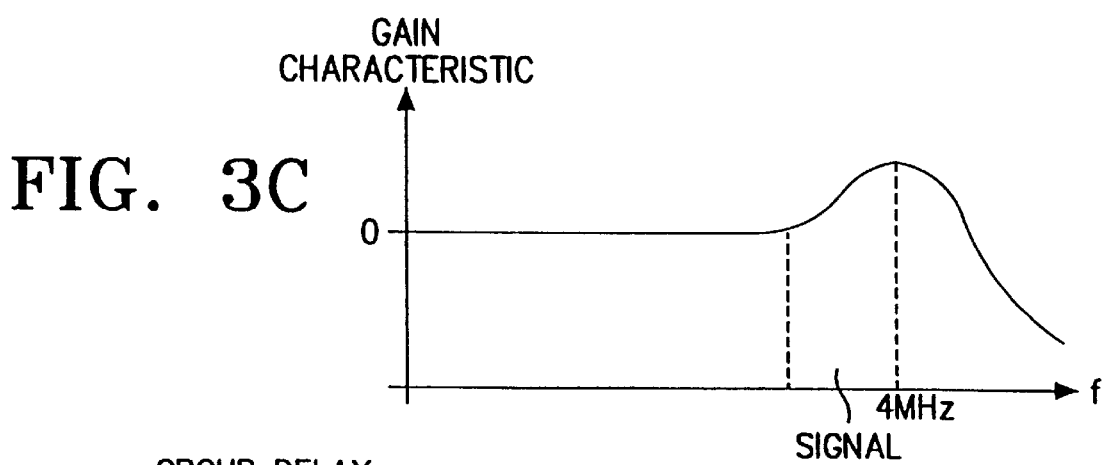
FIGS. 3C and 3D show, respectively, the same characteristics for DVDP (Digital Versatile Disc Player) and DVD-ROM.
Figure 3D:
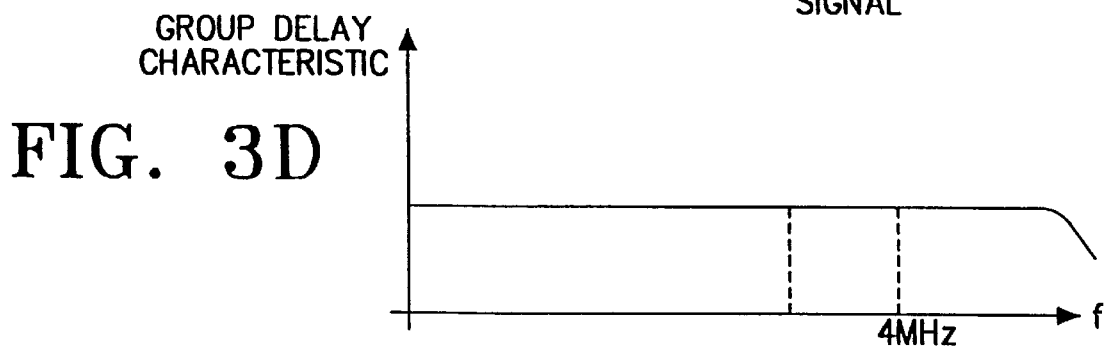

FIGS. 3A and 3B show the gain characteristics and the group delay characteristics, respectively of 1X speed CD, and FIGS. 3C and 3D show the gain characteristics and the group delay characteristics, respectively, of a DVD, which are produced by the boost filter 4 of the present invention. The boost peak point of 1X speed CD is 1 MHz, while DVD has boost a peak point of 4MHz. This difference depends on the control of the frequency and boost control unit 10. In FIGS. 3A thru 3D, a CD or DVD has a uniform group delay characteristic throughout all the frequency ranges of the corresponding signal. The distorted picked-up signal is boosted and its distortion is compensated as well.

According to the preferred embodiment of the present invention shown in FIG. 1, the boost circuit 6 is in front of the group delay 8. Alternatively the boost circuit can be positioned after the group delay 8, or between the plural low pass filters which form the group delay 8. The boost filter 4 is embodied with two input and two output, and thus S/N ratio is doubled. This is because the noise applied from outside is removed by using two signals at the buffer amplifier 12.

Output of boost filter 4, like those shown in FIGS. 2C and 2D, is applied to the buffer amplifier 12. The buffer amplifier 12 incorporates two outputs from the boost filter 4, into one signal, before amplifying in a specific ratio and outputting the signal. The signal outputted from the buffer amplifier 12 is shown in FIG. 2E.

Figure 4:
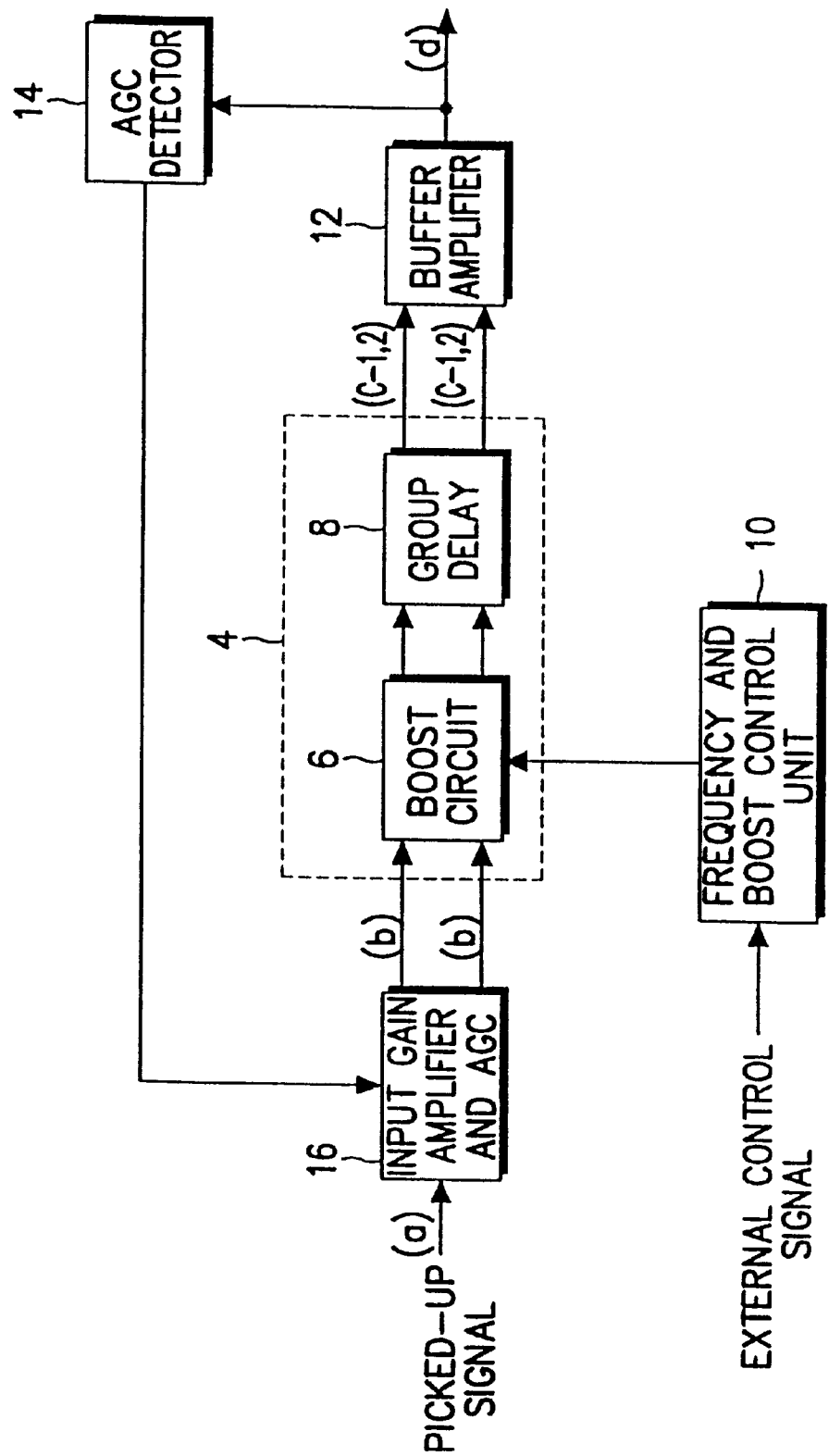
FIG. 4 is a block diagram showing the configuration of another preferred embodiment of the present invention.

FIG. 4 is a block diagram showing the configuration of another preferred embodiment of the present invention. Besides the components shown in FIG. 1, the apparatus further includes an AGC (Automatic Gain Control) detector 14 connected to output line of buffer amplifier 12, and an input gain amplifier and AGC 16, in which input gain amplifier 2 is incorporated with AGC. When an optical disc is rotated at a high speed in the high speed optical disc reproducing device, the signal is disturbed due to an unbalance of disc, etc, which acts as a low frequency noise. The AGC detector 14 detects the disturbance of the signal, before supplying it to AGC in the input gain amplifier and AGC 16, to remove the disturbance. Therefore, it is possible to remove low frequency noise caused by high speed rotation of optical disc.

The preferred embodiments of the present invention are applicable to data processing which requires a specific group delay irrespective of frequency alteration of signal, namely optical disc reproducing device for reading data of optical disc at a high speed, such as CD-ROM, DVDP (Digital Versatile Disc Player), DVD-ROM, etc. In addition, the preferred embodiments can be applied to disc producing devices of various kinds because they control frequency and boost gains independently.

As described above, a signal, with an attenuated frequency area of input signal, can be boosted and uniformly group delayed throughout all the frequency ranges of the input signal. The signal distortion caused by the difference in the pick-up and the disc characteristics of the high speed optical disc reproducing device can be minimized.

Additionally, it should be understood that the present invention is not limited to the particular embodiment disclosed herein as the best mode contemplated for carrying out the present invention, nor is the present invention limited to the specific embodiments described in this specification, except as defined in the following claims.

What is claimed is:

1. A high speed optical disc reproducing device comprising:

a gain amplifier, for amplifying data picked-up in an optical disc, into a specific amplification gain and outputting the amplified data as an output signal;

a frequency and boost control unit, for outputting a frequency and boost gain control signal under the control of a main control unit, in accordance with the kind of pick-up and disc used in the reproducing device; and a boost filter, which boosts high frequency signals of the output signal of the gain amplifier according to the frequency and boost gain control signal, and causes a uniformly group-delaying of all the frequency areas of the output signal.

2. The device according to claim 1, wherein the boost filter includes a boost circuit for boosting the high frequency signals of the output signal of the gain amplifier in accordance with the frequency and boost gain control signal, and a group delay for uniformly group-delaying the output signal throughout all the frequency ranges of output signal of the gain amplifier.

3. The device according to claim 2, wherein the group delay has filter characteristics expressed as a transfer function:

$$F(s)=(s^2-c^2)/(s^2+as+b),$$

where, the value of zero pole, which is a root of $s^2-c^2$, is $\pm c$, and factors a and b are selected by bessel function values.

4. The device according to claim 1, wherein in order to remove noise in the output signal applied from outside, the gain amplifier has one input and two outputs and the boost filter has two inputs and two outputs, and a buffer amplifier is further provided to incorporate the two outputs from the boost filter, into a single signal, before amplifying the single signal by a specific ratio and outputting the amplified single signal.

5. A high speed optical disc reproducing device comprising:

a gain amplifier and an automatic gain control unit for amplifying data picked-up from an optical disc, by a specific amplification gain, which responds to a predetermined automatic gain control signal to perform automatic gain control;

a frequency and boost control unit for outputting a frequency and boost gain control signal under the control of a main control unit, in accordance with the kind of pick-up and disc used in the reproducing device;

a boost filter which serves the functions for boosting of high frequency of output signal of the gain amplifier according to the frequency and boost gain control signal, and uniform group-delaying irrespective of all the frequency areas of the output signal; and an automatic gain control detector for detecting disturbances in the output signal of the boost filter, caused by high speed rotation of the optical disc, before outputting the automatic gain control signal, to remove the disturbances.

6. The device according to claim 5, wherein the boost filter includes a boost circuit for boosting the high frequency signals of the output signal of the gain amplifier and automatic gain control unit in accordance with the frequency and boost gain control signal, and a group delay for uniformly group-delaying the output signal throughout all the frequency ranges of output signal of the gain amplifier and automatic gain control unit.

7. The device according to claim 5, wherein the group delay has filter characteristics expressed as a transfer function:

$$F(s)=(s^2-c^2)/(s^2+as+b),$$

where, the value of zero pole, which is a root of $s^2-c^2$, is $\pm c$, and factors a and b are selected by bessel function values.

8. The device according to claim 5, wherein in order to remove noise in the output signal applied from outside, the gain amplifier and the automatic gain control unit have one input and two outputs and the boost filter has two inputs and two outputs, and a buffer amplifier is further provided to incorporate the two outputs from the boost filter, into a single signal, before amplifying the single signal by a specific ratio and outputting the amplified single signal.

* * * * *